United States Patent
Lin (10) Patent No.: US 8,426,063 B2
(45) Date of Patent: Apr. 23, 2013

(54) METHOD OF ELECTRICALLY CONNECTING CELL TERMINALS IN A BATTERY PACK

(75) Inventor: Sheau-Pyng Lin, Cupertino, CA (US)

(73) Assignee: Atieva, Inc., Redwood City, CA (US)

( * ) Notice: Subject to any disclaimer, the term of this patent is extended or adjusted under 35 U.S.C. 154(b) by 843 days.

(21) Appl. No.: 12/372,656

(22) Filed: Feb. 17, 2009

(65) Prior Publication Data

US 2009/0208837 A1  Aug. 20, 2009

Related U.S. Application Data

(60) Provisional application No. 61/029,300, filed on Feb. 15, 2008.

(51) Int. Cl.
*H01M 4/02* (2006.01)

(52) U.S. Cl.
USPC .......................................... 429/211; 429/209

(58) Field of Classification Search .................... 429/100
See application file for complete search history.

(56) References Cited

U.S. PATENT DOCUMENTS

| | | | |
|---|---|---|---|
| 5,418,083 A * | 5/1995 | Tamaki et al. | 429/53 |
| 5,764,027 A | 6/1998 | Harvey | |
| 6,365,297 B1 | 4/2002 | Wolczak et al. | |
| 6,399,238 B1 | 6/2002 | Oweis et al. | |
| 6,504,342 B2 | 1/2003 | Inui et al. | |
| 6,573,687 B2 | 6/2003 | Kimura et al. | |
| 6,762,590 B2 | 7/2004 | Yudahira | |
| 6,882,129 B2 | 4/2005 | Boskovitch et al. | |
| 7,128,999 B1 | 10/2006 | Martin et al. | |
| 7,193,391 B2 | 3/2007 | Moore | |
| 7,217,473 B2 | 5/2007 | Ovshinsky et al. | |
| 7,602,145 B2 | 10/2009 | Renda | |
| 2003/0107352 A1 | 6/2003 | Downer et al. | |
| 2005/0031936 A1 | 2/2005 | Joos | |
| 2006/0026822 A1 | 2/2006 | Seman, Jr. et al. | |
| 2007/0009787 A1 | 1/2007 | Straubel et al. | |
| 2007/0020524 A1 * | 1/2007 | Kim et al. | 429/245 |
| 2007/0188147 A1 | 8/2007 | Straubel et al. | |
| 2007/0218353 A1 | 9/2007 | Straubel et al. | |
| 2007/0252556 A1 | 11/2007 | West et al. | |
| 2010/0015519 A1 | 1/2010 | Trester et al. | |

FOREIGN PATENT DOCUMENTS

| | | |
|---|---|---|
| EP | 0727833 B1 | 8/1996 |
| EP | 1770804 A1 | 4/2007 |
| JP | 2006-074860 * | 3/2006 |

* cited by examiner

*Primary Examiner* — Ula C Ruddock
*Assistant Examiner* — Jacob Marks
(74) *Attorney, Agent, or Firm* — Womble Carlyle Sandridge & Rice, LLP (57) ABSTRACT

A battery pack that economically and reliably interconnects a large number of small form-factor battery cells. A conducting plate with a plurality of sets of tabs protruding from a flat surface of the conducting plate is used to connect electrical terminals of a plurality of battery cells. Each set of tabs is disposed about and exerts a spring force to a respective battery cell, thus mechanically securing and electrically connecting the conducting plate to the cell.

17 Claims, 14 Drawing Sheets

Front View

Fig. 5A

Cross Section

Fig. 5B

Plate Top View

Terminal Contacts On Cathode Plate
Top view of cathode plate

Fig. 7A

Side view of cathode plate

Table 1

| CONFIGURATION - LiFePO4 18650XZ 25°C | | | | | | |
|---|---|---|---|---|---|---|
| CAPACITY AT END OF LIFE | 70% | 70% | 70% | 80% | 80% | 80% |
| DRIVING RANGE PER YEAR(km) | 12,000 | 24,000 | 36,000 | 12,000 | 24,000 | 36,000 |
| capacity (KWh) @25°C, 2C, SOL | 20.1 | 20.1 | 20.1 | 20.1 | 20.1 | 20.1 |
| capacity (KWh) @25°C, 2C, EOL | 14.1 | 14.1 | 14.1 | 16.1 | 16.1 | 16.1 |
| range/charge (km) SOL | 147 | 147 | 147 | 147 | 147 | 147 |
| range/charge (km) EOL | 103 | 103 | 103 | 118 | 118 | 118 |
| total life in MWh | 16.5 | 28.5 | 37.5 | 11.1 | 19.3 | 25.6 |
| total life in km | 120,800 | 208,077 | 274,084 | 81,261 | 140,890 | 186,511 |
| total life in years | 10.1 | 8.7 | 7.6 | 6.8 | 5.9 | 5.2 |
| Cost per km | 0.157 | 0.091 | 0.069 | 0.234 | 0.135 | 0.102 |

FIG. 9B

| PACK REQUIREMENTS | | | | | | |
|---|---|---|---|---|---|---|
| USABLE SPACE (mm) | length(X) | width(Y) | height(Z) | | | |
| | 920 | 692 | 296 | | | |
| PACK DESIGN ASSUMPTIONS | space btw module (mm) | space btw cells (mm) | space for enclosure (mm) | mounting space per block (cells) | | |
| | 10 | 2 | 5 | 2 | | |
| PACK VOLTAGE REQUIREMENT | operating Vmin | operating Vmax | | | | |
| | 250 | 385 | | | | |
| PACK WEIGHT MAX (kg) | 255 | | | | | |
| PACK LIFE MIN (km) | 160,000 | | | | | |
| AVG BAT PWR / SPD (Wh/km) | 137 | | | | | |
| CELL SPEC | | | | | | |
| CELL SIZE (mm) | diameter | height | weight(g) | | | |
| | 18 | 65 | 38 | | | |
| CELL CHARACTERISTIC @25°C, 1C, at beg of life | capacity nom (Ah) | Vnom (v) | Vmax (v) | Vmin(v) | R (ohm) | Discharge Voltage @25°C, 2C |
| | 1.2 | 3.2 | 3.6 | 2.5 | 0.045 | 94% |
| CELL DEGRADATION PER CYCLE @25°C | 0.00005 | 0.00005 | 0.00005 | 0.00005 | 0.00005 | 0.00005 |
| CELL DEGRADATION PER YEAR @25°C | 2.5% | 2.5% | 2.5% | 2.5% | 2.5% | 2.5% |
| CELL DEGRADATION PER KM @25°C | 2.0833E-06 | 1.0417E-06 | 6.9444E-07 | 2.0833E-06 | 1.0417E-06 | 6.9444E-07 |

FIG. 9C

| PACK DESIGN - module in XZ plane | | | | | | | |
|---|---|---|---|---|---|---|---|
| max rows / module | 16 | | | | | | |
| max columns / module | 45 | | | | | | |
| modules / pack | 9 | | | | | | |
| max blocks / pack | 106 | | | | | | |
| max blocks / module | 11 | | | | | | |
| selected modules / pack | 9 | | | | | | |
| selected rows / module | 16 | | | | | | |
| selected blocks / module | 10 | | | | | | |
| selected columns/module | 40 | | | | | | |
| blocks/pack | 90 | | | | | | |
| cells / block | 62 | | | | | | |
| total cells / pack | 5,580 | | | | | | |
| capacity (KWh) @25°C, 2C, SOL | 20.1 | 20.1 | 20.1 | 20.1 | 20.1 | 20.1 | |
| capacity (KWh) @25°C, 2C, EOL | 14.1 | 14.1 | 14.1 | 16.1 | 16.1 | 16.1 | |
| capacity (KWh) @25°C, 2C, avg | 17.1 | 17.1 | 17.1 | 18.1 | 18.1 | 18.1 | |
| total life-long capacity (MWh) | 16.5 | 28.5 | 37.5 | 11.1 | 19.3 | 25.6 | |
| range/charge (km) SOL | 147 | 147 | 147 | 147 | 147 | 147 | |
| range/charge (km) EOL | 103 | 103 | 103 | 118 | 118 | 118 | |
| range/charge (km) avg | 125 | 125 | 125 | 132 | 132 | 132 | |
| total life in km | 120,800 | 208,077 | 274,084 | 81,261 | 140,890 | 186,511 | |
| total life in years | 10.1 | 8.7 | 7.6 | 6.8 | 5.9 | 5.2 | |
| total life in cycles | 967 | 1,665 | 2,193 | 614 | 1,065 | 1,410 | |
| heat @100A (W) | 653 | | | | | | |
| cell weight (kg) | 212 | | | | | | |
| space for other parts | | | Module dimensions - 2mm border | | | | |
| length (mm) | 104 | | length (mm) | 811 | | | |
| width (mm) | 12 | | width (mm) | 74 | | | |
| height (mm) | 9 | | height (mm) | 282 | | | |

FIG. 9D

| COST | | | | | | |
|---|---|---|---|---|---|---|
| cell unit cost | $ 2.00 | | | | | |
| cell total cost | $ 11,160 | | | | | |
| other cost of pack | $ 2,900 | | | | | |
| *total matl cost* | $ 14,060 | | | | | |
| factory headcount | 30 | | | | | |
| production rate unit/mon | 400 | | | | | |
| factory expense/mon | $ 20,000 | | | | | |
| *factory ovhd* | *$ 206* | | | | | |
| total cost | *$ 14,266* | | | | | |
| gross margin | 25% | | | | | |
| Price | *$ 19,022* | $ 19,022 | $ 19,022 | $ 19,022 | $ 19,022 | 19,022 |
| *Cost per km* | *$ 0.157* | *$ 0.091* | *$ 0.069* | *$ 0.234* | *$ 0.135* | *0.102* |

US 8,426,063 B2

METHOD OF ELECTRICALLY CONNECTING CELL TERMINALS IN A BATTERY PACK

CROSS-REFERENCE TO RELATED APPLICATIONS

This application claims priority to, and hereby incorporates by reference, U.S. Provisional Application No. 61/029,300, filed on Feb. 15, 2008.

FIELD OF THE INVENTION

The present invention relates to multi-cell battery systems.

BACKGROUND

Battery packs have been used in automotive and industrial applications for many years. Traditionally, these battery packs use a relatively small number of large battery cells, typically lead-acid type battery cells. A battery pack design that uses a small number of large battery cells has several disadvantages. First, if one of the cells fails, a substantial percentage of the overall energy capacity would be lost. For example, for a pack using 11 cells, a single cell failure would result in a 9% loss of total capacity. Second, such a battery pack has poor thermal cooling efficiency. The cooling efficiency of a cell is proportional to the cell's surface-area-to-volume ratio. A larger cell has a smaller surface-area-to-volume ratio compared to that of a smaller cell. Battery cells degrade when subject to elevated temperatures. For example, lithium-ion batteries lose 20% of their usable charge within three months when subjected to 60° C. temperature; in contrast, they will lose the same percentage of charge in three years when the temperature is held at 25° C. Therefore, heat dissipation is an important factor in the design of a battery pack.

Figure 1A:
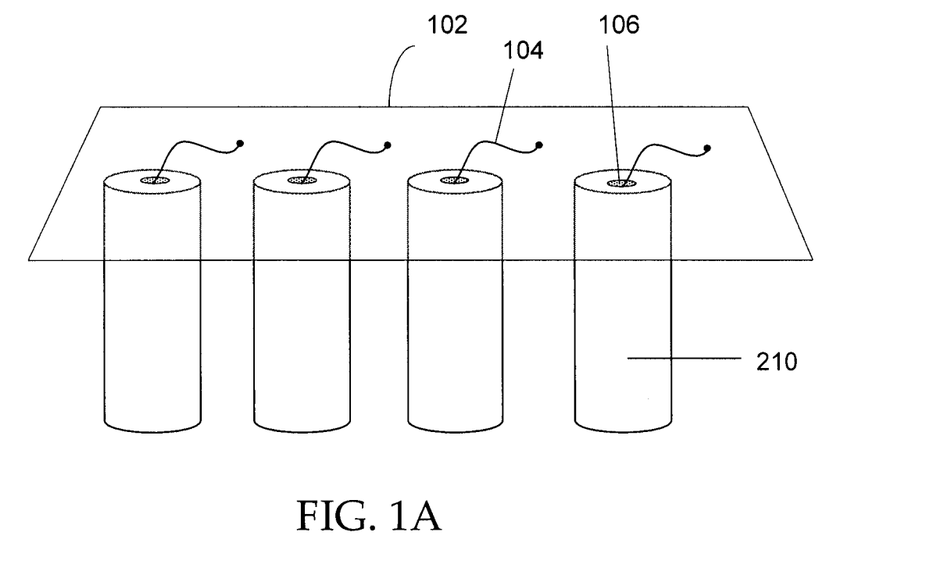
FIGS. 1A and 1B illustrate conventional methods of electrically connecting terminals of a plurality of battery cells.
Figure 1B:
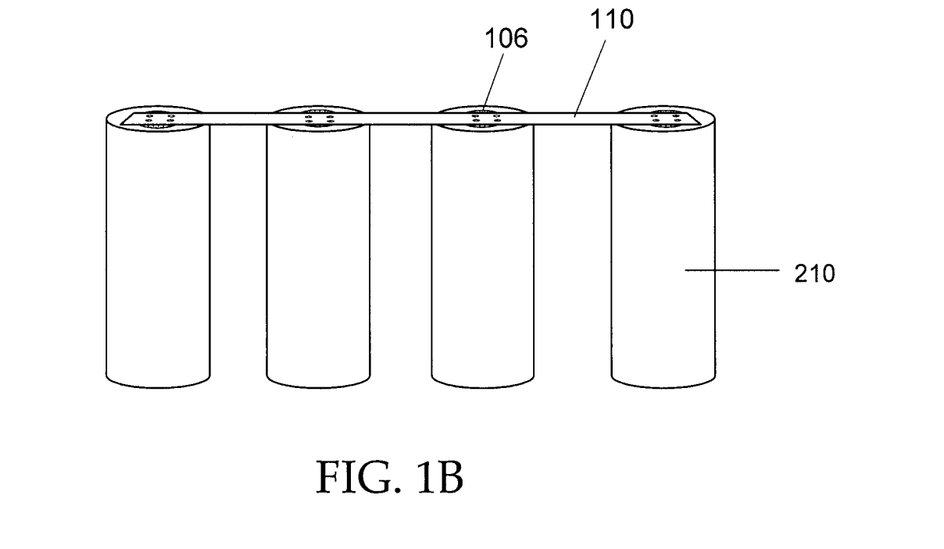

Recently, high-density, small form-factor battery cells, previously limited to relatively low-power (and therefore low cell-count) applications such as laptop computers and power tools, have been proposed for high cell-count automotive and industrial battery packs. Unfortunately, such battery packs tend to be tremendously expensive, due in part to the large number of pack components and the complexity involved in interconnecting such a large number of cells 210 using conventional interconnection techniques (e.g., conducting wires 104 coupled from respective cell terminals 106 to a metal plate 102 as shown in FIG. 1A, or a metal strip 110 welded to cell terminals 106 as shown in FIG. 1B). Moreover, conventional cell interconnections (welded wires or strips) are susceptible to failure when the cells dislocate slightly during operation, for example, due to vibration within a moving vehicle.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A low part-count battery pack that economically and reliably interconnects a large number of small form-factor battery cells is disclosed in various embodiments.

Figure 2:
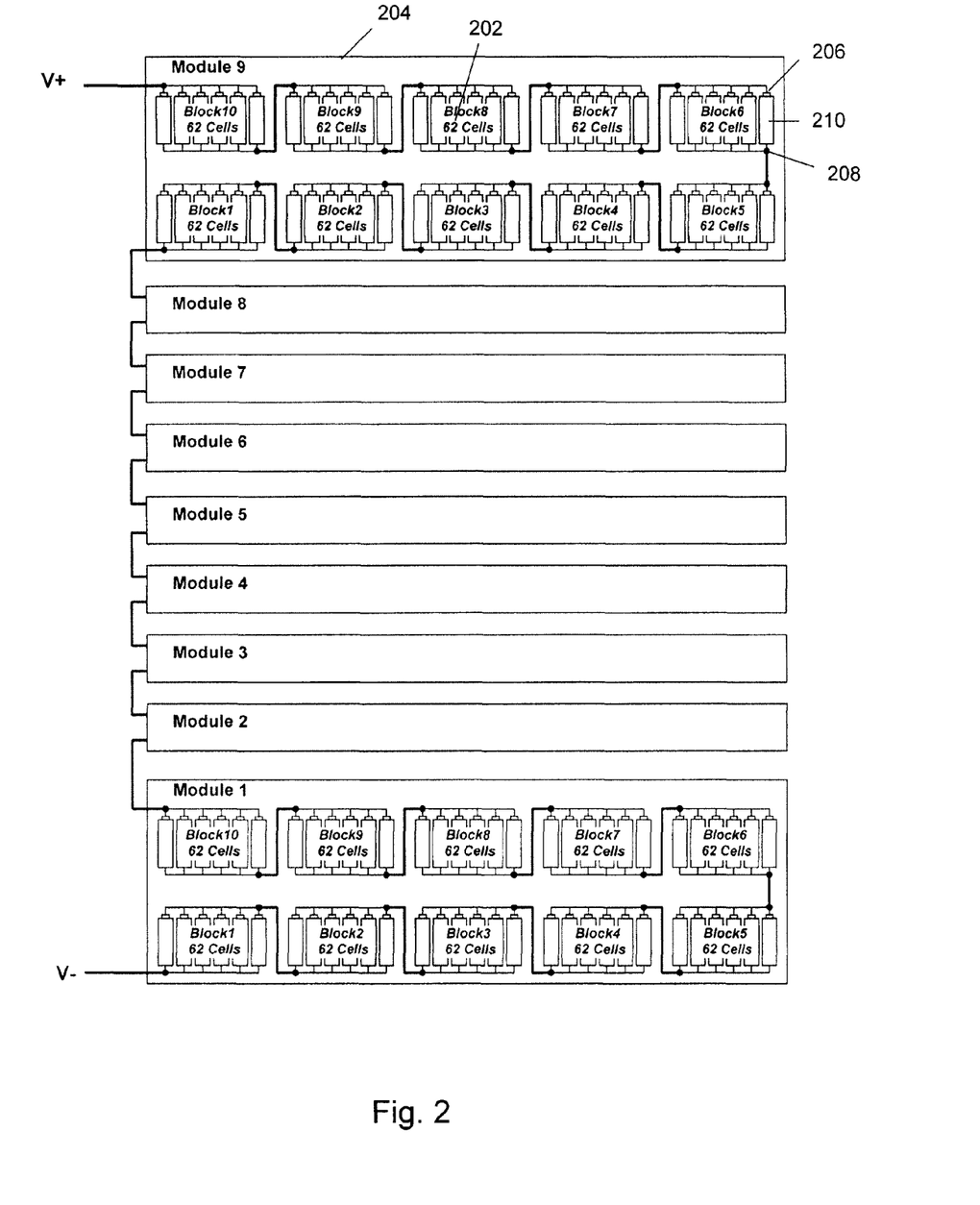
FIG. 2 illustrates one embodiment of a battery pack using a large number of small battery cells.

FIG. 2 shows one embodiment of a battery pack using a large number of small battery cells. In this embodiment, cells 210 are grouped into a number of blocks 202; blocks are in turn grouped into modules 204. In the example shown in FIG. 2, each pack comprises nine (9) modules; each module comprises ten (10) blocks; and each block comprises sixty two (62) cells. Therefore, there are a total number of five thousand five hundred and eighty (5580) cells in a pack. Each cell 210 has a positive and a negative terminal, called a cathode 206 and an anode 208, respectively. In this embodiment, the cells in each block are electrically connected in parallel, i.e., the cathodes are connected together, and the anodes are connected together. The blocks in each module are connected in series, i.e., the cathode of the first block is connected to the anode of the second block, the cathode of the second block is connected to the anode of the third block, and so on and so forth. In addition, the modules are also connected in series. The total voltage potential of a pack is the voltage at the cathode of the last block of the last module (module number 9, block number 10 in the example shown in FIG. 2, marked as 'V+') relative to the anode of the first block of the first module (marked as 'V−' in FIG. 2). Therefore, the total voltage of a pack is equal to the voltage potential of each block times the number of blocks in each pack.

Figure 9A:
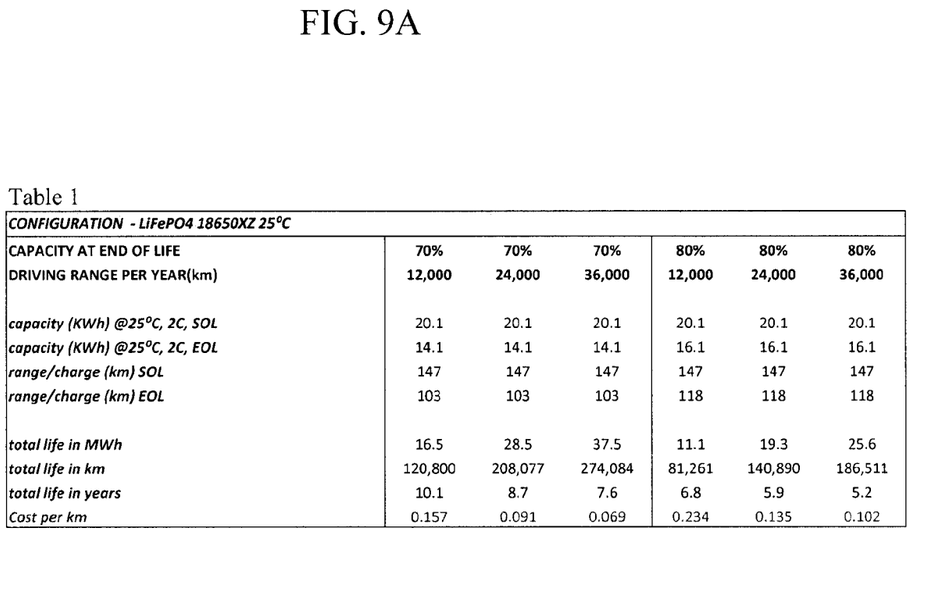
FIGS. 9A-9D show a representative set of design parameters for a battery pack intended to be used in an electric vehicle.
Figure 9B:
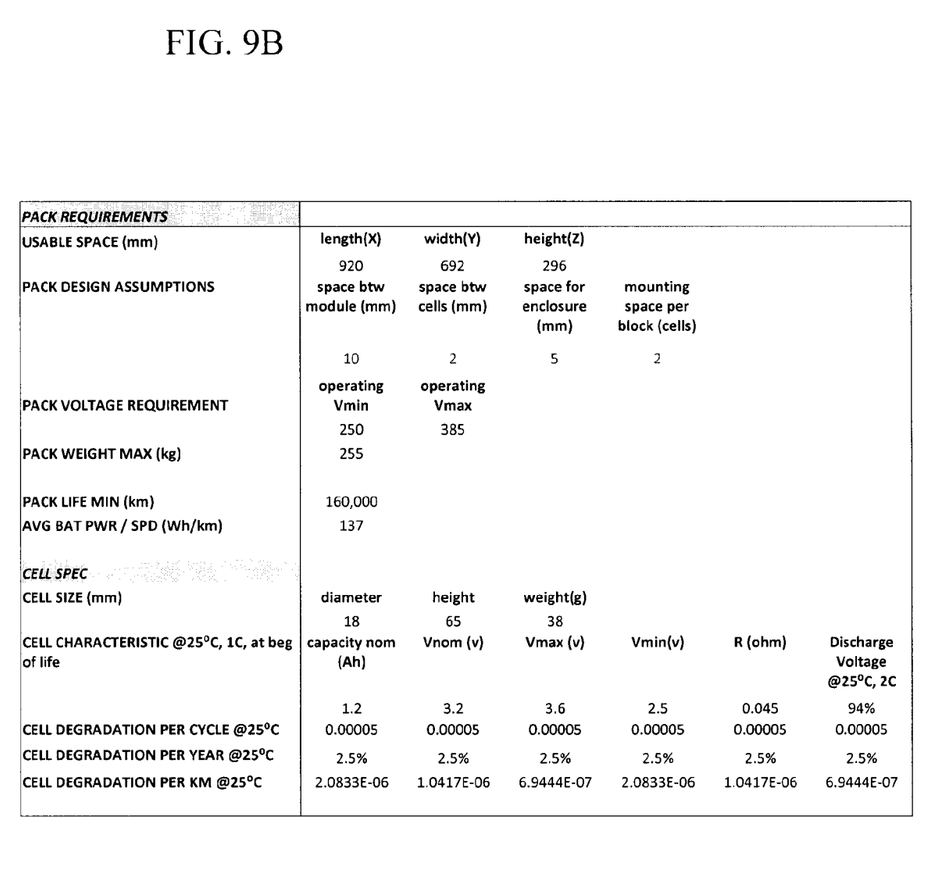
Figure 9C:
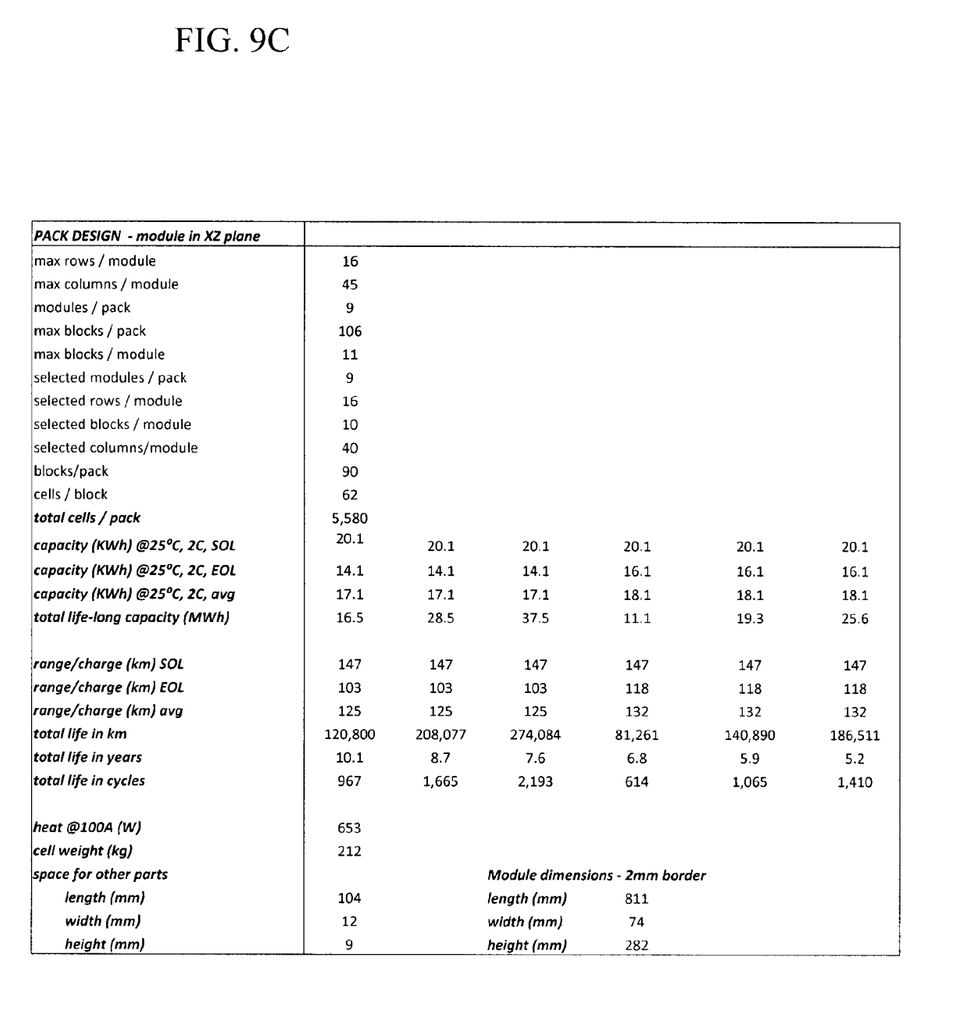
Figure 9D:
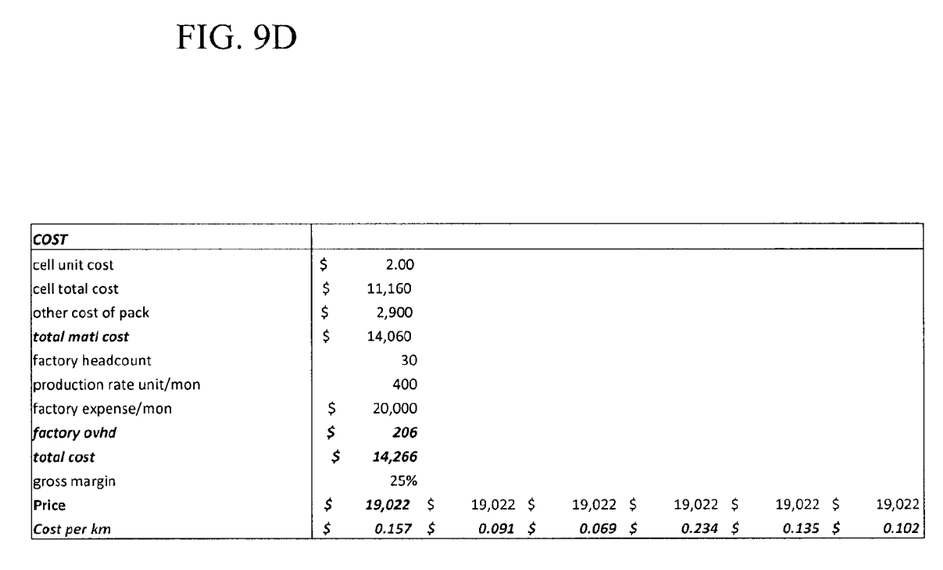

FIGS. 9A-9D show a representative set of design parameters for a battery pack intended to be used in an electric vehicle using standard 18650-type lithium-ion battery cells. FIG. 9A of the spreadsheet summarizes the required electrical capacity and estimated total life of a battery pack. FIG. 9B, labeled 'pack requirements', shows dimensional and electrical characteristics of the battery pack. FIG. 9C, labeled 'pack design' shows the number of cells, modules, and blocks in a pack, derived according to the information from FIG. 9B of the spreadsheet. FIG. 9D shows the calculation of an estimated cost of a battery pack.

Figure 3:
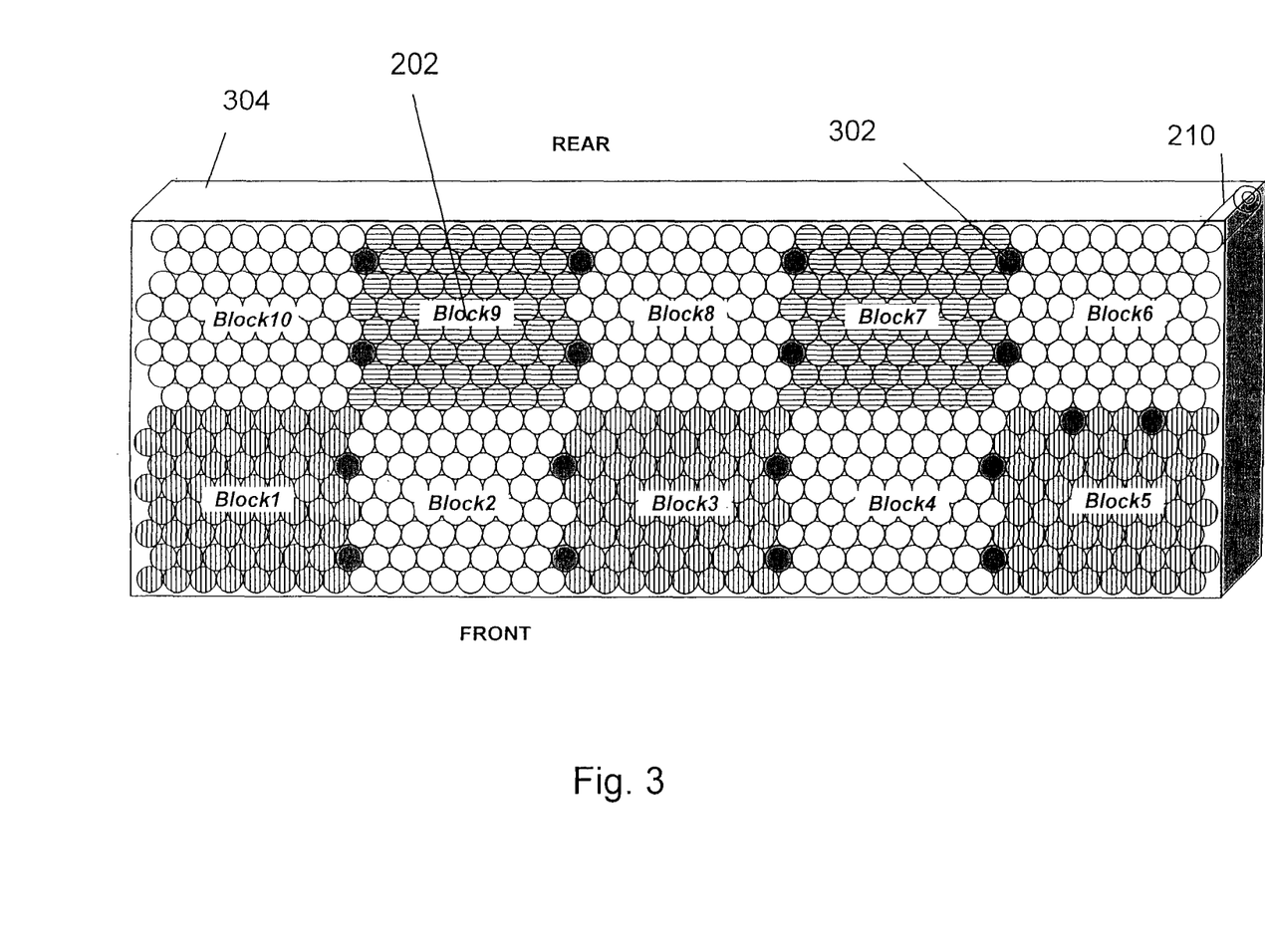
FIG. 3 illustrates one embodiment of the physical layout of battery cells in a module.

FIG. 3 shows one embodiment of a physical layout of the battery cells in each module 304. In this example, cells 210 have a cylindrical shape with a circular cross section. Cells are arranged in a compact honeycomb array as shown in FIG. 3. In alternative embodiments, the cylindrical cells may have other types of cross section, such as triangular, square, rectangular, or hexagonal shape, and the cells may be arranged in other types of array, such as a square or rectangular array, or in an irregular array.

For each block 202, there are two cylindrical bus bars 302, shown as dark gray circles in FIG. 3. The bus bars are made of a conducting material, such as aluminum. The bus bars electrically connect the cathode of one block to the anode of the next block, providing a low resistance path for the current to flow between adjacent blocks. The bus bars also provide mechanical support for holding the module together and for preventing pressure on the module enclosure from being transferred to the cells.

Figure 4:
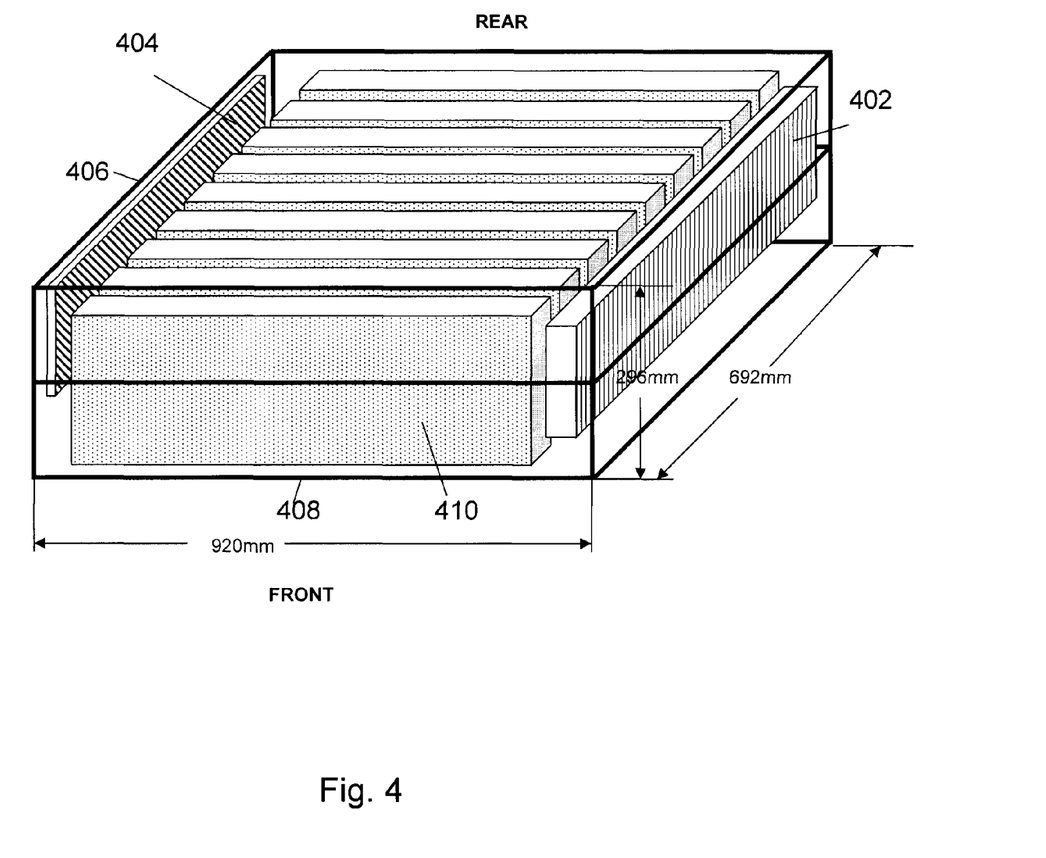
FIG. 4 illustrates one embodiment of the layout of a pack comprising a plurality of modules.

FIG. 4 shows one embodiment of a pack layout. In this example, the pack 408 includes nine modules 410. In one embodiment, each module is oriented in a vertical plane, for example, with the front of module 410 corresponding to the front of module 304 of FIG. 3. A unified cooling system 402 provides even cooling for each cell. A battery management system 404 provides fault-tolerant, self-learning, and self-repairing controls of battery operation. The pack 408, including the cooling system 402 and battery management system 404, is enclosed in an enclosure 406

Figure 5A:
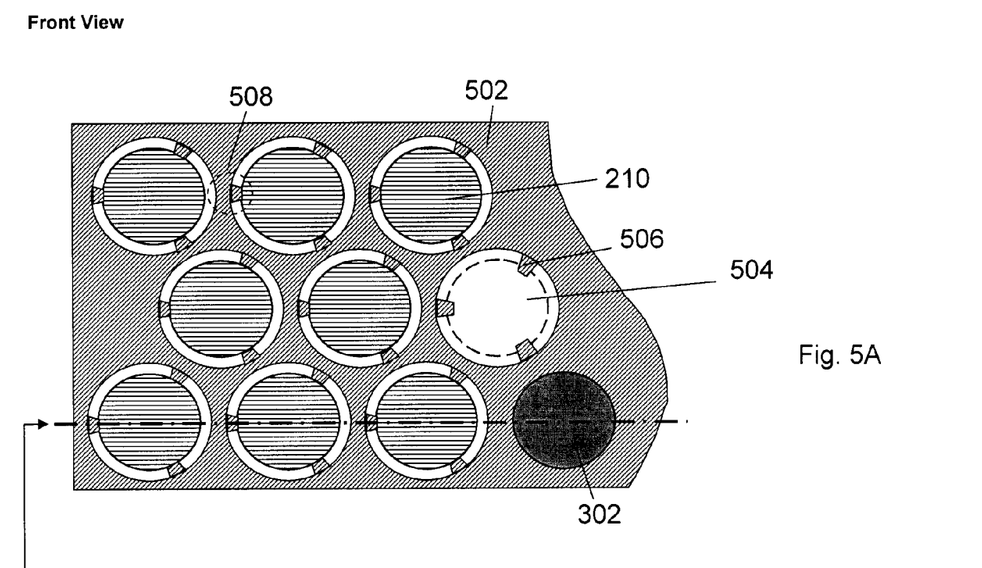
FIGS. 5A and 5B illustrate one embodiment of a frame that holds a plurality of cells in a module.
Figure 5B:
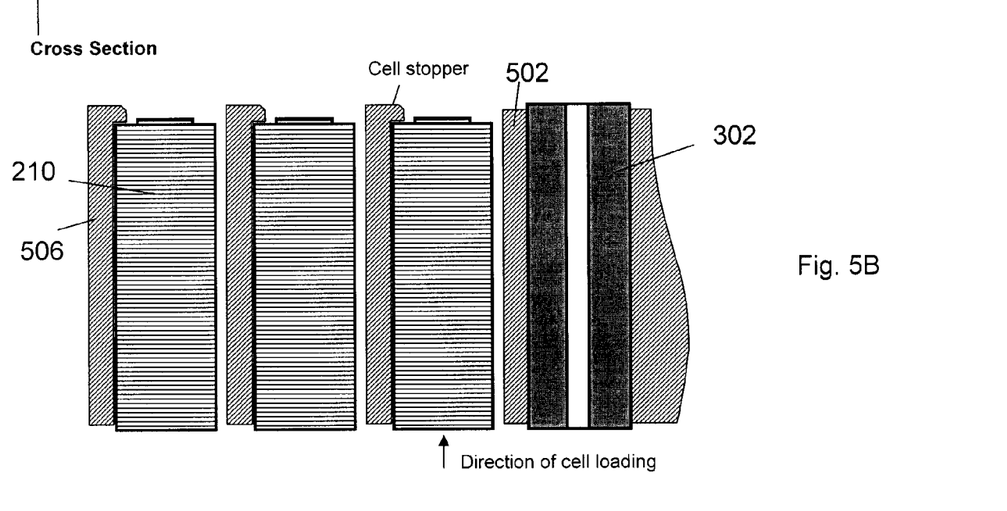

In one embodiment, the cells in each module are held together by a frame 502 made of an insulating material, such as plastic. The material of the frame is chosen for mechanical strength, and for its thermal properties such as its tolerable temperature range and thermal conductivity. The frame has a plurality of cylindrical holes 504 into which battery cells 210 may be inserted as shown in FIGS. 5A and 5B. In this example, each hole 504 has a circular cross section with a diameter slightly larger than that of cell's cross section. In one embodiment, three deformable plastic beams 506 each having a cell-stop or lip 512 are attached to or formed integrally with the inner wall of each hole and extend along the length of the hole. As a cell 210 is pressed into the hole (i.e., until a leading surface of the cell contacts the cell-stop 512 as shown), the beams 506 are compressed slightly so that they exert a gentle pressure on the side of the cell to hold the cell securely in place. More generally, any manner of securing a battery cell within the hole may be used, including friction-contact with the cell wall or projections thereof. The plurality of holes 504 is arranged in a desired pattern, which is a compact honeycomb pattern in this example. As shown in FIG. 5A, each deformable beam 506 is disposed in a position 508 where the plastic wall surrounding the hole is the thinnest. The thinness of the plastic wall provides some flexibility when the cell is pressed into the hole. The bus bars 302 are also held in place by the same frame. The cells are oriented so that cathodes all face the front side and anodes all face the rear side.

Figure 6A:
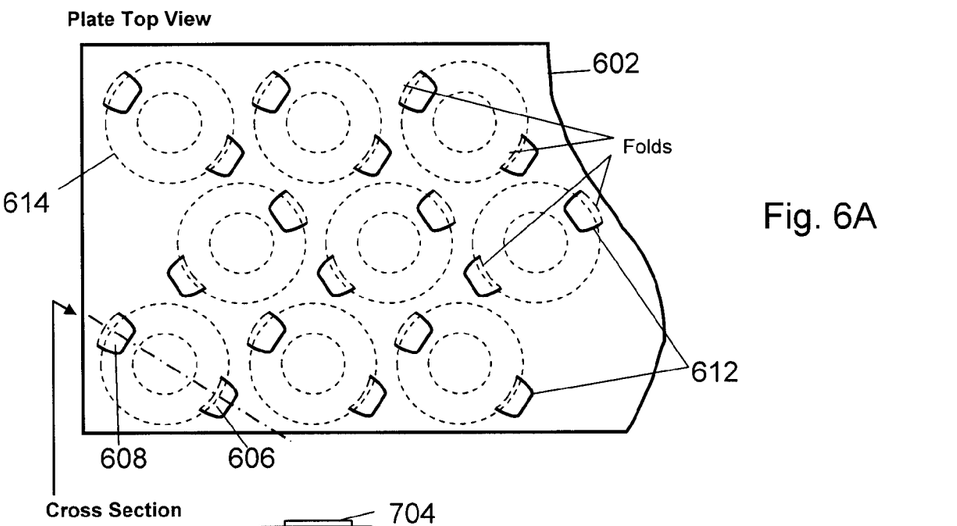
FIGS. 6A and 6B illustrate one embodiment of an anode plate electrically connecting the anode terminals of a plurality of cells.
Figure 6B:
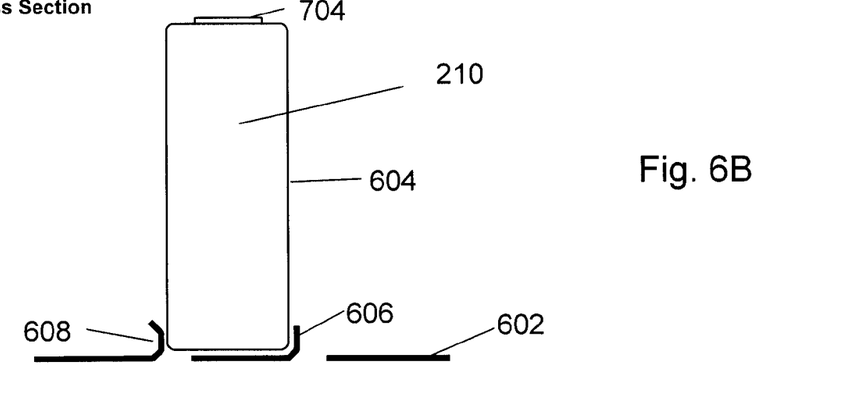

To connect the anodes of the cells in each block together, a conducting plate called an anode plate is used. FIGS. 6A and 6B show one embodiment of the anode plate 602. In this example, the anode plate is made of aluminum and has a thickness of about 1 mm. The anode ends 604 of the cells are held in mechanical and electrical contact with the anode plate 602 by a plurality of pairs of tabs 606 and 608 protruding from one side of the anode plate. In one embodiment, the two tabs 606 and 608 in each pair are disposed on opposite sides of a circumference 614, representing the cross section of a battery cell, shown as one of the dashed circles in FIG. 6A. Each tab is formed, for example, by cutting a slot 612 on the conducting plate along a partial circumference of a geometrical shape (e.g., a semi-circle), shown as solid lines in FIG. 6A. The slots 612 can be cut by using a laser, punch, stamp or other cutting means. The area of the plate that is partially separated from the rest of the plate as the result of the cut is then folded to form a spring. In this example, the first tab 606, referred herein as the stop tab, is folded perpendicular to the plate, and the second tab 608, referred herein as the press tab, is folded backward (e.g., approximately 180 degrees, although different bend angles may be used), as shown in FIG. 6B. As the anode end of a cell 604 is disposed between the two tabs, the press tab 608 exerts a spring force on the side of the cell, pushing the cell against the stop tab 606, thus holding the cell firmly in place, securing the anode plate 602 to the cell 210. In this example, the electrical connection between a cell's anode terminal 604 and the anode plate 602 is made through the physical contacts between the tabs and the side of the cell, as well as between the flat surface of the anode plate and the bottom of the cell. (Note that, in this example, the entire case of a cell, including the side and bottom, is the anode terminal.) In alternative embodiments, a set of more than two tabs can be used to secure the anode end of each cell to the anode plate. The tabs may also be folded to form springs with different shapes. The tabs may also be made separately and be attached to the anode plate.

Referring to FIG. 6A, the plurality of circumferences 614, shown in dashed outlines and around which respective sets of tabs are disposed, is arranged in a pattern that is aligned with the hole pattern in the frame 502 which holds the cells, so that the anode plate 602 can be readily snapped onto the anode ends of the cells being held in the frame.

The method of electrically connecting anodes of a plurality of cells in a battery pack described above has at least two advantages as compared to the traditional methods illustrated in FIG. 1. First, the connection is easily implemented by snapping the anode plate onto the anode ends of a plurality of battery cells held together by the frame. No welding is required. Second, the spring mechanism of the tabs 606 and 608 allows a looser tolerance on the relative positions of cells with respect to each other. Therefore the connections are robust against slight relative movement of cells caused by operation conditions such as vibrations in a moving vehicle.

Figure 7A:
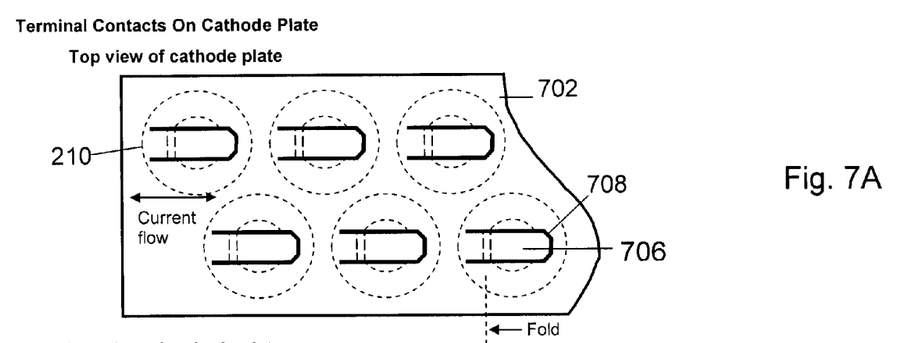
FIGS. 7A and 7B illustrate one embodiment of a cathode plate electrically connecting the cathode terminals of a plurality of cells.
Figure 7B:
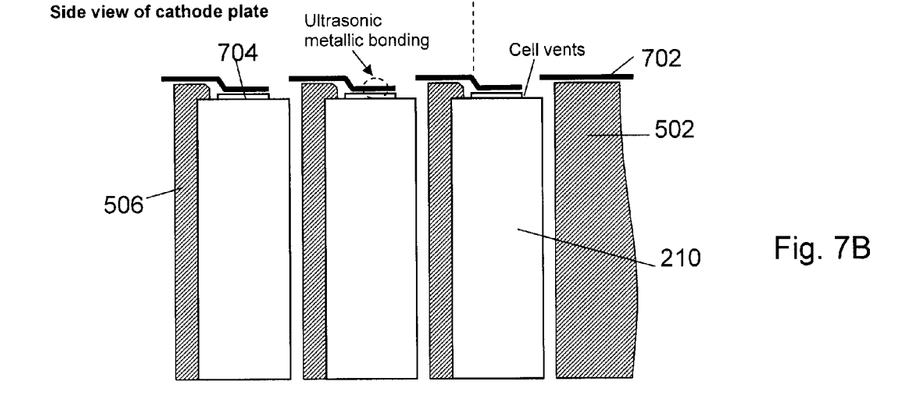
Figure 7C:
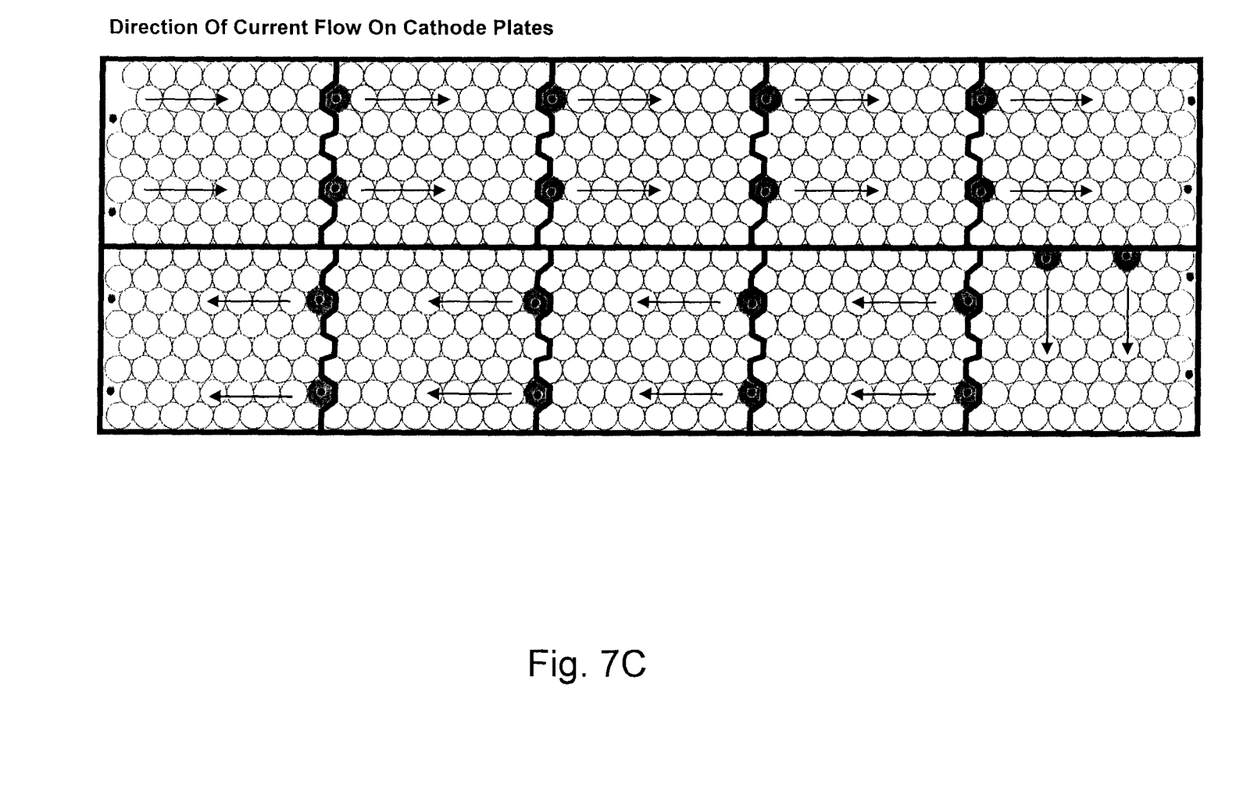
FIG. 7C illustrates the direction of current flow on cathode plates in a module.

FIGS. 7A and 7B illustrates one embodiment of a cathode plate 702 that electrically connects cathode terminals 704 of a plurality of cells. In this example, the cathode plate is made of aluminum and is very thin. A plurality of oblong tabs 706 are formed by cutting a plurality of slots 708 into the cathode plate 702 using a laser, punch, stamp or other cutting means, as shown in FIG. 7A. The tabs 706 are arranged in a pattern that is aligned with the pattern of the holes 504 in the frame 502 which holds the cells. As the cathode plate 702 is placed on top of the cathode ends of the cells held in the frame, the tabs 706 are bended slightly downward to make contacts with cells' cathode terminals 704, as shown in FIG. 7B. The tabs 706 are then welded to the cells' cathode terminals using ultrasonic metallic bonding or other welding means. FIG. 7C shows the direction of current flow on cathode plates.

Figure 8A:
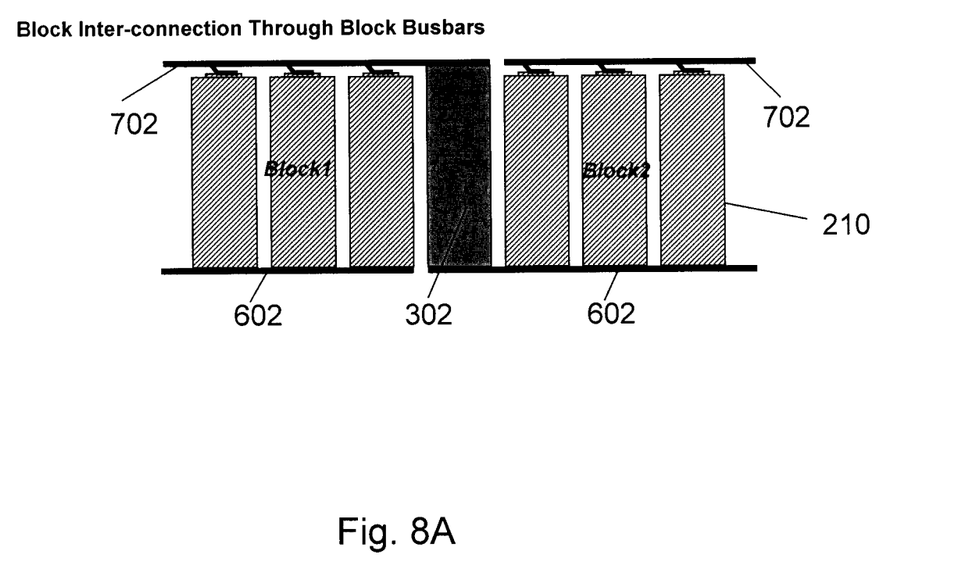
FIG. 8A illustrates one embodiment of the electrical connection between adjacent blocks.
Figure 8B:
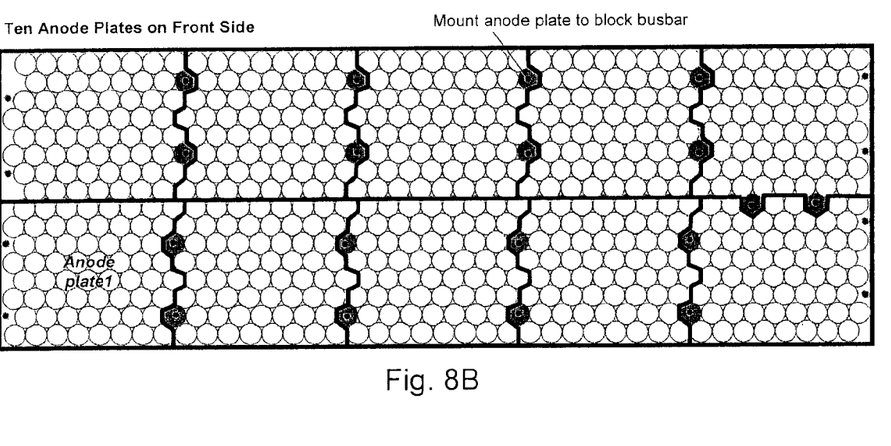
FIGS. 8B-8C illustrate the layouts of anode plates and cathode plates on the front and rear side of each module, respectively.
Figure 8C:
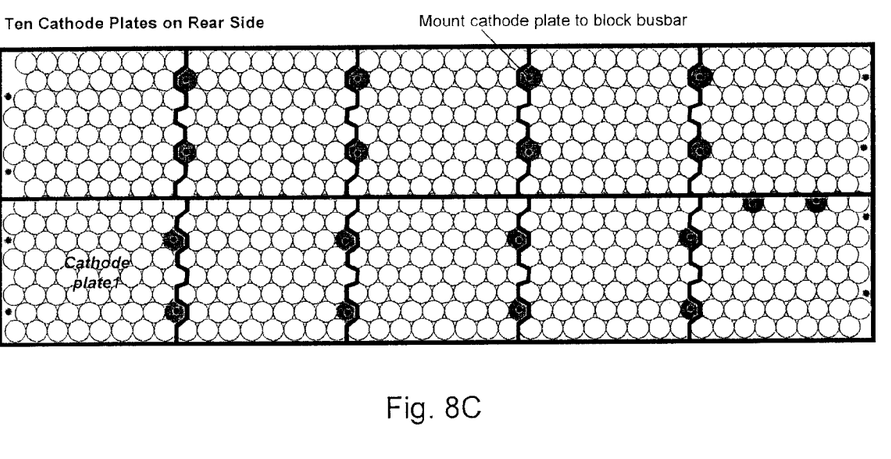

FIG. 8A shows one embodiment of the electrical connection between adjacent blocks. The cathode plate 702 of one block is electrically connected to the anode plate 602 of the next block via a conducting bus bar 302 that is held in the same frame 502 that holds the cells 210, as described above. FIG. 8B and 8C illustrate the layouts of anode plates and cathode plates on the front and rear side of each module, respectively.

While the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. A battery system comprising:
   a plurality of battery cells;
   a conducting plate with at least one flat surface;
   a plurality of sets of tabs protruding from the flat surface, each set of tabs being disposed about and exerting a spring force to a respective battery cell, thus mechanically securing and electrically connecting the conducting plate to the cell; wherein each of the battery cells is cylindrical and has a side with a circular cross-section, and wherein each set of tabs is formed integrally with the conducting plate and comprises a first tab folded to form a stop against which the side of the respective battery cell is pressed and a second tab operable to exert a force on the side of the battery cell to press the battery cell against the stop formed by the first tab.

2. The system of claim 1 wherein the plurality of sets of tabs is formed integrally with the conducting plate.

3. The system of claim 2 wherein each tab is formed by cutting a slot on the conducting plate along a partial circumference of a geometrical shape and folding an area of the plate that is partially separated from the rest of the plate as a result of the cut.

4. The system of claim 3 wherein each set of tabs includes a first tab to contact the battery cell and second tab to force the battery cell against the first tab.

5. The system of claim 1 wherein the conducting plate comprises aluminum.

6. The system of claim 1 wherein each tab in the plurality of sets of tabs protruding from the flat surface is mechanically bonded to the respective battery in the plurality of battery cells.

7. A battery pack frame to hold a plurality of battery cells comprising:
   one or more module frames, each containing battery cell cavities to accommodate respective battery cells;
   a conducting plate having a flat surface;
   a plurality of sets of tabs protruding from the flat surface of the conducting plate, each set of tabs being disposed about a respective battery cell cavity to exert a force to a battery cell when the battery cell is inserted into the battery cell cavity and to electrically connect the conducting plate to the battery cell; wherein each of the battery cells is cylindrical and has a side with a circular cross-section, and wherein each set of tabs is formed integrally with the conducting plate and comprises a first tab folded to form a stop against which the side of the respective battery cell is to be pressed and a second tab operable to exert the force on the side of the battery cell to press the battery cell against the stop formed by the first tab.

8. The battery pack frame of claim 7 wherein the battery cell cavities are arranged in a compact honeycomb array.

9. The battery pack frame of claim 7 wherein the battery cell cavities are cylindrical.

10. The battery pack frame of claim 7 wherein at least one of the battery cell cavities contains a deformable beam disposed on an inner wall of the battery cell cavity that deforms to exert a securing force against a battery cell inserted into the one of the battery cell cavities.

11. The battery pack frame of claim 7 wherein a bus bar is disposed inside one of the battery cell cavities to electrically connect cathodes of battery cells inserted into the battery cell cavities of a first one of the module frames to anodes of all battery cells inserted into the battery cell cavities of another one of the module frames.

12. The battery pack frame of claim 11 wherein the bus bar mechanically strengthens the first one of the module frames.

13. The system of claim 1 wherein the first and second tabs are disposed in contact with the side of the respective battery cell at diametrically opposite points of the circular cross section.

14. The system of claim 1 wherein the plurality of sets of tabs enable the conducting plate to be snapped onto anode ends of the plurality of battery cells to establish secure electrical contact thereto without welding.

15. The battery pack frame of claim 7 wherein each module frame comprises more than two cavities to receive more than two battery cells, and wherein the conducting plate is to electrically connect the more than two battery cells to one another.

16. The battery pack frame of claim 7 wherein the first and second tabs are disposed to contact the side of the respective battery cell at diametrically opposite points of the circular cross section.

17. The battery pack frame of claim 7 wherein the plurality of sets of tabs enable the conducting plate to be snapped onto anode ends of the plurality of battery cells to establish secure electrical contact thereto without welding.

* * * * *